United States Patent [19]

Hendrick et al.

[11] Patent Number: 5,055,659
[45] Date of Patent: Oct. 8, 1991

[54] HIGH SPEED SYSTEM FOR READING AND WRITING DATA FROM AND INTO REMOTE TAGS

[75] Inventors: Peter L. Hendrick, Los Alamos; Donald F. Speirs, San Juan; Michael A. Wolf, Los Alamos, all of N. Mex.

[73] Assignee: Amtech Technology Corp., Santa Fe, N. Mex.

[21] Appl. No.: 475,729

[22] Filed: Feb. 6, 1990

[51] Int. Cl.$^5$ .......................... G01S 13/76; G06K 7/10
[52] U.S. Cl. ..................................... 235/439; 235/375; 235/492; 342/44; 375/48; 375/49
[58] Field of Search ..................... 235/439, 449, 492; 375/48, 49, 55; 341/58, 71–73; 340/40, 43; 342/44, 50, 51

[56] References Cited

U.S. PATENT DOCUMENTS

| | | | |
|---|---|---|---|
| 3,632,876 | 1/1972 | Bench | 375/49 |
| 3,801,911 | 4/1974 | vön Horsten | 375/48 X |
| 4,287,596 | 9/1981 | Chari | 375/49 |
| 4,360,810 | 11/1982 | Landt | 343/6.5 R |
| 4,473,851 | 9/1984 | Nagura et al. | 360/43 |
| 4,599,736 | 7/1986 | Hoppe | 375/49 X |
| 4,739,328 | 4/1988 | Koelle et al. | 342/44 |
| 4,786,907 | 11/1988 | Koelle | 342/51 |
| 4,835,377 | 5/1989 | Brown | 235/492 |
| 4,888,591 | 12/1989 | Landt et al. | 342/44 |
| 4,912,471 | 3/1990 | Tyburski et al. | 342/44 X |
| 4,937,581 | 6/1990 | Baldwin et al. | 342/44 |
| 4,951,049 | 8/1990 | Whitfield | 341/64 |

Primary Examiner—David Trafton
Assistant Examiner—Steven M. duBois
Attorney, Agent, or Firm—Roger S. Borovoy

[57] ABSTRACT

A system for reading from and for writing data into electronic tags which may be associated with objects which are moving with respect to an interrogator, or may be located in fixed positions in the path of a moving interrogator. The interrogator, which is stationary if the tag is moving, sends a continuous RF signal to the remote tag. The tag backscatter-modulates the received RF signal with data temporarily or permanently stored in the tag, including, for example, data associated with the object to which the tag is attached, for example, its identity or contents. The system of this invention uses a very efficient encoding technique for the data which is backscatter-modulated by the tag and received by the interrogator. The backscatter-modulated signals are made up of signals of first and second frequencies $f_1$ and $2f_1$, respectively, where the second frequency $2f_1$ is twice the first frequency $f_1$, and where one of the two binary bits ONE and ZERO is represented by one-half period of a signal of the first frequency followed by one period of the second frequency, and the other of the two binary bits is represented by one period of a signal of the second frequency followed by one-half period of a signal of the first frequency. The signals also contain FRAME MARKERS made up of five periods of frequency $2f_1$ followed by one-half period of frequency $f_1$.

25 Claims, 4 Drawing Sheets

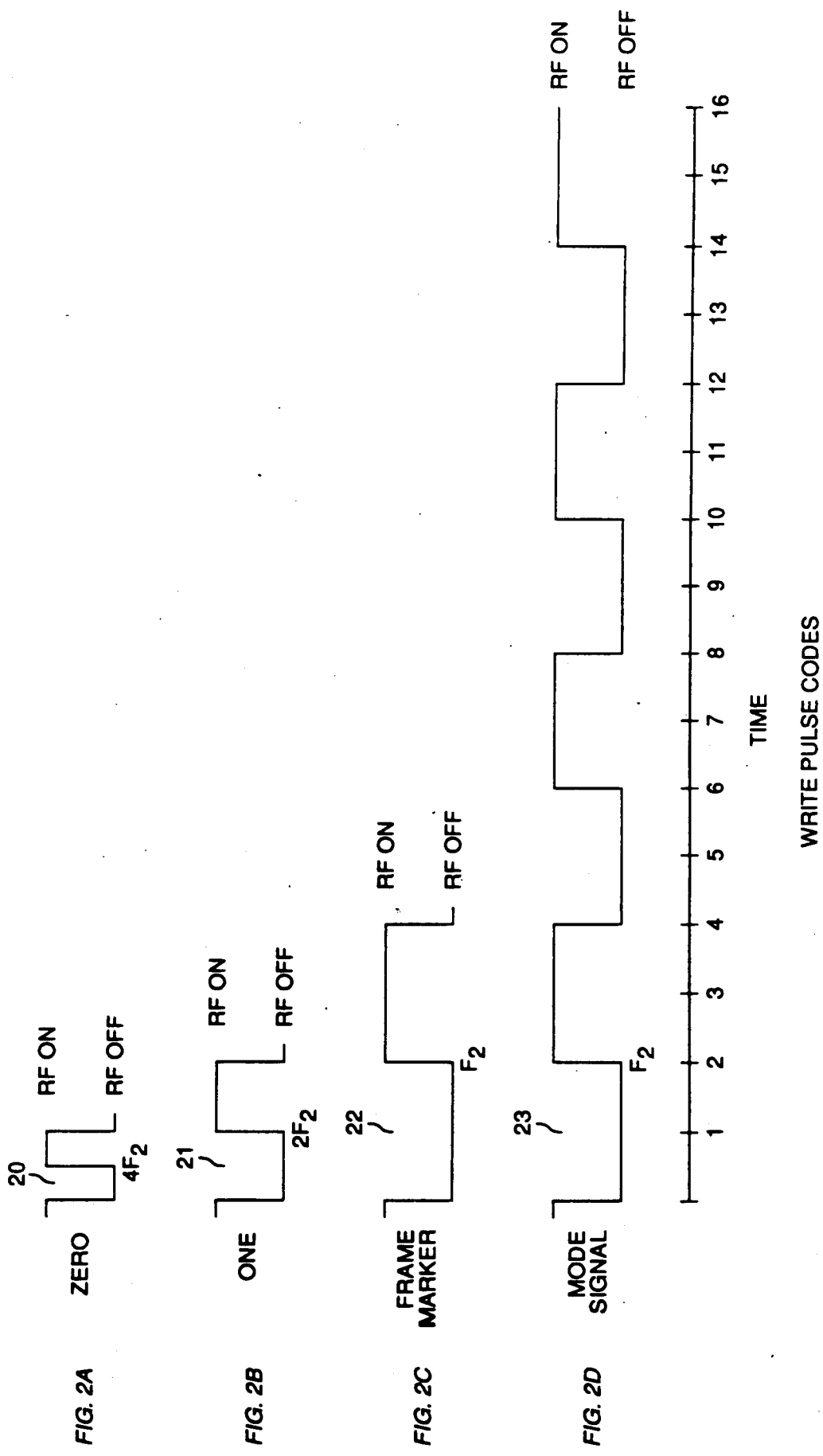

TAG STATE DIAGRAM

HIGH SPEED SYSTEM FOR READING AND WRITING DATA FROM AND INTO REMOTE TAGS

BACKGROUND OF THE INVENTION AND PRIOR ART

The subject invention relates to a high speed system for reading data from remote tags and for writing data into those tags. There are a number of prior art object and vehicle identification systems which use electronic tags containing fixed data about the particular object. These electronic tags were originally developed by the Los Alamos National Laboratory at Los Alamos, New Mexico, for the Department of Agriculture to identify livestock animals. A tag containing the animal's identification data in coded, electronically readable form, is attached to or implanted in the animal. Electronic readers are placed at feeding stations to READ the tags as the animals passed nearby. These readers, also called interrogators, transmit a continuous RF signal which, in turn, is "backscatter-modulated" with the identification data from the tag. These tags have an antenna which reflects the modulated signal, containing the information from the tag, to the interrogator. These early systems are described in U.S. Pat. Nos. 4,075,632 and 4,360,810.

As the technology progressed, it was found that these systems for identifying remote moving objects had utility far beyond animal identification. For example, the tags may be attached to any moving or moveable objects, such as automobiles, shipping containers, or railroad cars. Alternatively, the interrogator may be attached to the moving vehicle and tags located in fixed positions along its path. The information in these tags can be used to keep track of the location and path of travel of these moving vehicles or other objects. Railroad rolling stock can be continually monitored at stations or along the tracks so that their location and identity can be continually tracked on a central computer. U.S. Pat. Nos. 4,739,328; 4,782,345; 4,786,907; 4,816,839; 4,835,377 and 4,853,705 all generally describe aspects of these systems, including antennas and programmers used in these identification systems.

In certain applications, it has become important not only to be able to READ the data contained in these electronic tags, but also to modify that data, or to WRITE data into the tags while either the tags or the interrogators, used for supplying the data to be written, are in motion. For example, it may be important not only to know the identity of a railroad car, but also its contents. The list of these contents may be compiled by a computer, and may then be written into a tag attached to a railroad car as it passes interrogators along its route. The system of this invention uses a very efficient coding technique which considerably lessens the communication time required between the tag and the interrogator while maintaining very high levels of reliability. This enables the tags or the interrogators to be moving at very high speeds.

For such high speed operation, the coding schemes of the prior art are not efficient enough. Data rates need to be increased from about 10 kilobaud to almost 200 kilobaud. At the same time, since conventional interrogators decode the tag information using limiting amplifiers, it is necessary to provide this more efficient code, yet still enable a tag to backscatter-modulate the data without introducing a transmitted d.c. signal component. These limiting amplifiers used in interrogators have trouble with signals having significant d.c. components.

One possible solution to the problem, which does not increase the d.c. component of the signal, is to increase the signal data rate by increasing the clock rate. The problem with this solution, however, is that higher clock rates require more current and thus more power, causing a concomitant reduction in tag battery life. Accordingly, even though some increase in clock rate may be necessary to achieve the required data rate, it became an objective of this invention to increase the code efficiency rather than to rely entirely on the more brute force approach of increasing clock rate.

BRIEF DESCRIPTION OF THE INVENTION

Briefly, the system of this invention for reading from and for writing data into tags, which may be in motion relative to an interrogator, employs an interrogator for sending an RF signal to the tag, usually attached to a remote object. Alternatively, tags may be located in fixed positions and the interrogator may be moveable. The interrogator is capable of transmitting data by modulating the RF signal to be received and stored by the tag. The tags are capable, upon receipt of a continuous RF signal, of backscatter-modulating that RF signal and returning a signal which is backscatter-modulated with data contained in the tag's memory, such as data indicating the identity or contents of the remote object to which the tag is attached.

To improve the code efficiency in accordance with this invention, the backscatter-modulated READ signal (named because it is read by the interrogator) is made up of signals of first and second frequencies $f_1$ and $2f_1$, respectively, where the second frequency $2f_1$ is twice the first frequency $f_1$, and where one of the two binary bits ONE and ZERO is represented by one-half period of a signal of the first frequency followed by one period of the second frequency, and the other of the two binary bits is represented by one period of a signal of the second frequency followed by one-half period of a signal of the first frequency. Between periods of each frequency, there is a transition in the signal from high to low or from low to high. The actual data rate is flexible, and may be scaled to suit the application. Therefore, as long as the two frequencies are related by $f_1$ and $2f_1$, their absolute values may vary.

This READ coding scheme has significant advantages. First, the data rate, for any given value of $f_1$, is increased by a factor of two over prior art coding schemes. That means the amount of data passed in a given amount of elapsed time is doubled.

The READ pulse codes representing a binary ONE, a binary ZERO, or a FRAME MARKER work properly even when the signals are received inverted from their normal form. Every other binary bit is inverted by the tag from its predecessor bit and still is properly decoded by the interrogator. This technique reduces to zero the d.c. component of a transmitted signal representing a sequence of two binary bits. Furthermore, no errors will occur when bits or markers get inverted in the course of phase reversals during reception by the interrogator.

FRAME MARKER signals used to designate the end of a frame of a READ code signal are five periods of signal frequency $2f_1$ followed by one-half period of frequency $f_1$.

The backscatter-modulated signal from the tag alerts the interrogator that there is a READ/WRITE tag in its RF range, and that it may WRITE into that tag if it so desires. The interrogator may recognize that: (1) there is a READ/WRITE tag in its range; and (2) that such tag is ready to receive a WRITE of any data from the interrogator which is needed to be written into the tag's memory. The interrogator compares the received tag identification with its message list to see whether it has a message for that tag. If it does, it then sends the message to the tag by modulating the RF carrier.

The WRITE pulse codes of this invention sent by the interrogator also are unique, and provide a substantial increase over the prior art codes in speed of data interchange between a tag and an interrogator. One of the two binary bits, ONE and ZERO, is represented by a signal of frequency $2f_2$ and the other bit by a signal of frequency $4f_2$, twice the frequency of the first bit. The MODE signal of the WRITE-by-RF transmissions must be easily distinguishable from backscatter-modulated READ signal pulses, discussed above, which can cause interference with this WRITE-by-RF signal. Therefore it is desireable that the MODE signal (to be discussed below) of the WRITE signal have a significantly longer period of a low value (no RF) than the periods of the READ signal pulses. For that reason, the frequency of the MODE signal is no greater than one-half of the lowest frequency used in the READ pulse codes. For example, if the lowest frequency READ pulse has a frequency of $f_1$, the frequency $f_2$ of the MODE signal may be equal to one-half $f_1$. Using this technique, the tag is able to reliably distinguish a MODE signal from the shorter READ pulses. This criteria is important since MODE signals must be reliably detected while the tag is modulating READ signals which may be interfering with the detected WRITE signals.

The MODE signal is even longer in duration than the FRAME MARKER. It is very easy to distinguish from any other READ signals because it has four periods of low (no RF), each of which is longer than the low period of any other READ signal. This provides lots of tolerance to noise. Using the WRITE signals of this invention, the MODE signal, which is the part of the WRITE sequence which changes the MODE of the tag, as will be explained later, is preferably four periods of a low value (RF off) with four intervening periods of a high value. If this type of signal is used for the MODE signal, each period may be the same duration as the FRAME MARKER. This can reduce the hardware complexity and associated cost required for signal encoding and decoding.

The interrogator has the capability of (1) recognizing the data from the backscatter-modulated signal, including, for example, identity data of the remote object to which the tag is attached, from the returned, backscatter-modulated signal and (2) transmitting data to the tag by modulating the RF signal. If desired, the interrogator may determine from the tag's identity whether it has data to be transmitted to that particular, identified tag. In this manner, data may be selectively transmitted to and received and stored by a tag only after the tag has been identified as the correct tag for the receipt of such data.

As soon as a tag comes within range of a continuous RF signal from an interrogator, the tag will receive and back-scatter-modulate the signal from the interrogator. The data will then be received and interpreted by the interrogator. These tags and interrogators are generally as described in U.S. Pat. No. 4,739,328, except the READ and WRITE pulse signals are as described herein. The modulated signal is returned to the interrogator which interprets the signal and captures all the data from the tag, which may include its identity as well as other information about the container or the freight car, for example to which it is attached, such as its weight, contents, size and the like.

Upon receipt of the WRITE message from the interrogator, the tag echoes its newly received data as a backscatter-modulated signal sent back to the interrogator. The interrogator, in turn, may check the new data which it gets back from the tag against the message it sent out on the transmitted RF signal. If there is agreement, the WRITE operation is successfully completed, and thus terminated. If there is an error, the interrogator may retransmit the parts of the message in error until the transaction is successfully completed.

BRIEF DESCRIPTION OF THE DRAWINGS

The invention will be better understood by reference to the following drawings in which:

FIGS. 2A-2D show the WRITE by RF pulse code of the invention;

DETAILED DESCRIPTION OF THE INVENTION

Many of the details of the tags and interrogators are not described herein except the aspects providing the novel features of this invention because they have been previously described in one or more of U.S. Pat. Nos. 4,739,328; 4,782,345; 4,786,907; 4,816,839; 4,835,377 and 4,853,705.

Referring to FIG. 1, the READ pulse codes of the invention are illustrated. If desired, using these codes, the tag may continually scroll the predetermined information in its memory so that it is ready to backscatter-modulate that information on any received RF signal of sufficient strength from an interrogator. Otherwise, scrolling may be instigated by receipt of a sufficiently strong RF signal from an interrogator. The backscatter-modulated information using the code format of FIG. 1 must be capable of being decoded by the interrogator sending the continuous RF signal. Moreover, since the tags or the interrogators of this invention are often travelling very fast relative to each other, such as on high speed trains, an interrogator must be able, very quickly, to decode the signal, determine the identity of the tag, and, if it so desires, to WRITE a message to the tag while the tag is still in writing range of the interrogator. This means that the tag identification step must happen very quickly. Data rates approaching 200 kilobaud are often required.

Figure 1A:
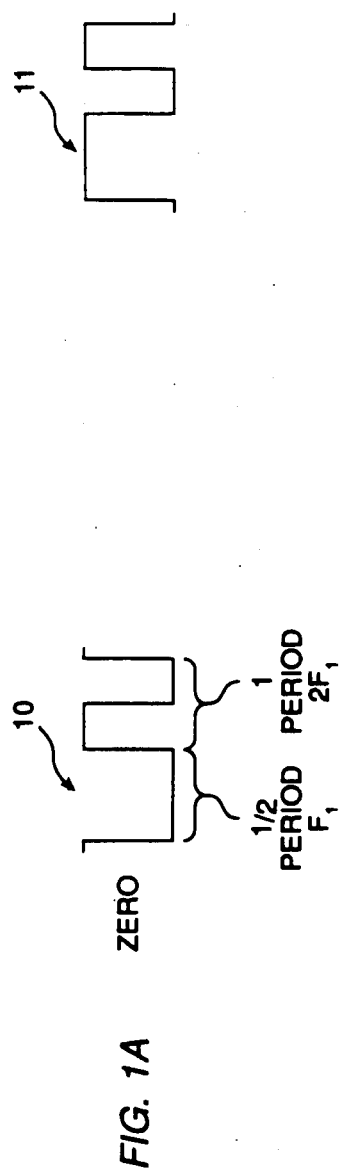
FIGS. 1A-1C show the READ-by-RF pulse code of the invention.
Figure 1B:
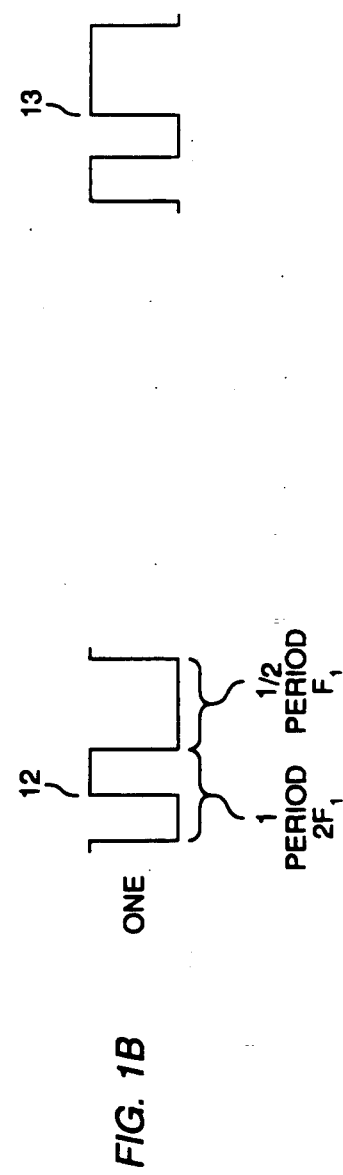

This identification step is speeded up considerably in this invention by the use of a new code shown in FIG. 1 for the backscatter-modulated data. To represent a binary ZERO, as shown in FIG. 1A, a signal 10 is used with one-half period at a first frequency $f_1$ followed by a full period at a second frequency $2f_1$, equal to twice the first frequency. A binary ONE is represented by the opposite sequence 12, shown in FIG. 1B, namely a full period at frequency $2f_1$ followed by one-half period at frequency $f_1$. These signals are shown in FIG. 1A and FIG. 1B above the heading "NORMAL". These signals also may be inverted as shown on the right side of FIG. 1, above the heading "INVERTED". Signal 11 is an inverted ZERO; signal 13 is an inverted ONE. The unique aspect of this particular set of signals is that they may be properly decoded as ONES and ZEROS whether in either their normal or inverted form. This coding technique of the invention inverts every other binary bit, as shown in FIG. 1.

The ability of the interrogator to receive either normal or inverted signals enables the tag, when backscatter modulating the signals, to invert every other bit. When the alternately inverted series of binary bits are received at the interrogator, they have a zero d.c. component, since the average level of the backscatter-modulated signal will be zero. With interrogators which use limiting amplifiers for detection, this has significant advantages.

Figure 1C:
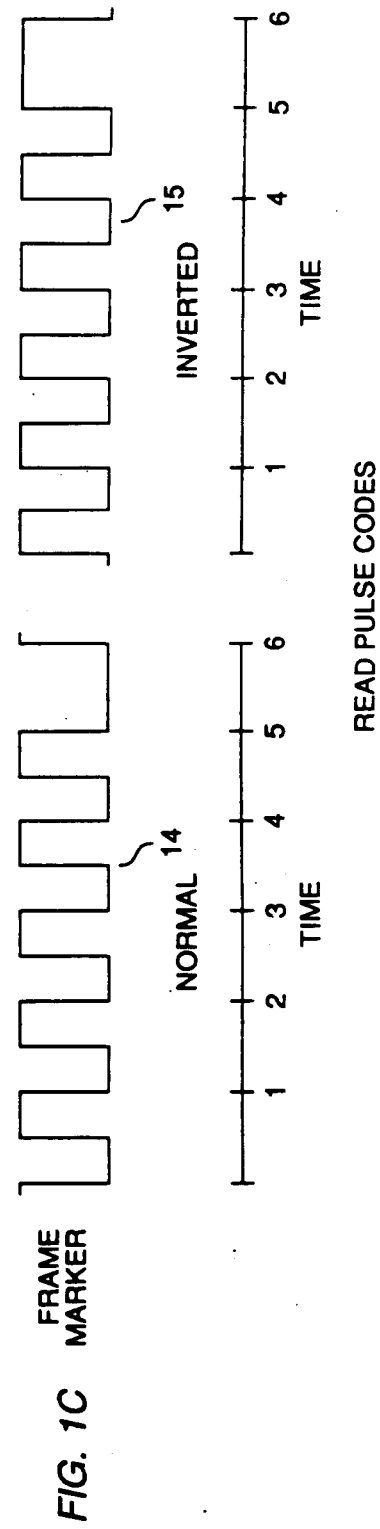

The READ code FRAME MARKER signals 14 and 15 shown in FIG. 1C mark the end of a frame of data. These signals, too, were uniquely designed to provide zero d.c. component when used within a frame consisting of an odd number of binary bits and yet be uniquely distinguishable in either their normal form 14 or inverted form 15 from any combination of a series of binary ZERO and ONE bits, whether any such bit is transmitted in its normal or inverted form. In order to ensure that the d.c. component of an entire frame, not just the FRAME MARKER, is equal to zero, the FRAME MARKER must be inverted relative to the bits preceding and following it, which in turn requires that a frame consists of an odd number of binary bits followed by a single FRAME MARKER.

The sequence of a FRAME MARKER having five periods of frequency $2f_1$ followed by one-half period of frequency $f_1$, whether in the normal or inverted form, satisfies this criterion. Additionally, the backscattered data, including ONES, ZEROS and FRAME MARKERS may become inadvertently inverted during reception depending on the phase angle difference between the transmitted and received signals. Therefore this data must be recognizable by the interrogator as FRAME MARKERS in either form.

The binary data format shown in FIG. 1, when backscatter-modulated by the tag, provides uniquely distinguishable binary code for ONES, ZEROS and FRAME MARKERS, yet is capable of twice the transmission speed at any given clock rate compared with prior art codes such as those described in U.S. Pat. No. 4,739,328.

In order to accomplish the WRITE operation, the interrogator and tag need use only four different WRITE signals using three different frequencies. For ease of understanding, these frequencies are $f_2$, $2f_2$ and $4f_2$, the second two being integral multiples of the first. The first signal 20, shown in FIG. 2A, represents a binary "ZERO" bit by turning the RF off for one-half period of frequency $4f_2$ followed by turning it on for the same amount of time. The second signal 21 shown in FIG. 2B, which turns the RF off for one-half period of frequency $2f_2$ and back on again for the same period of time, represents a binary ONE. The third FRAME MARKER signal 22 shown in FIG. 2C, turns the RF off for one-half period of frequency $f_2$ and back on again for the same amount of time. Finally, the MODE signal 23 shown in FIG. 2D, the use of which will be described below, turns the RF off and on, each for one-half period of frequency $f_2$, repeating that four times. The entire WRITE communication sequence between the interrogator and the tag may be carried out using only these four types of signals shown in FIG. 2, each of which is made up of a selection from three different frequencies, each being a multiple or submultiple of the others.

Figure 3:
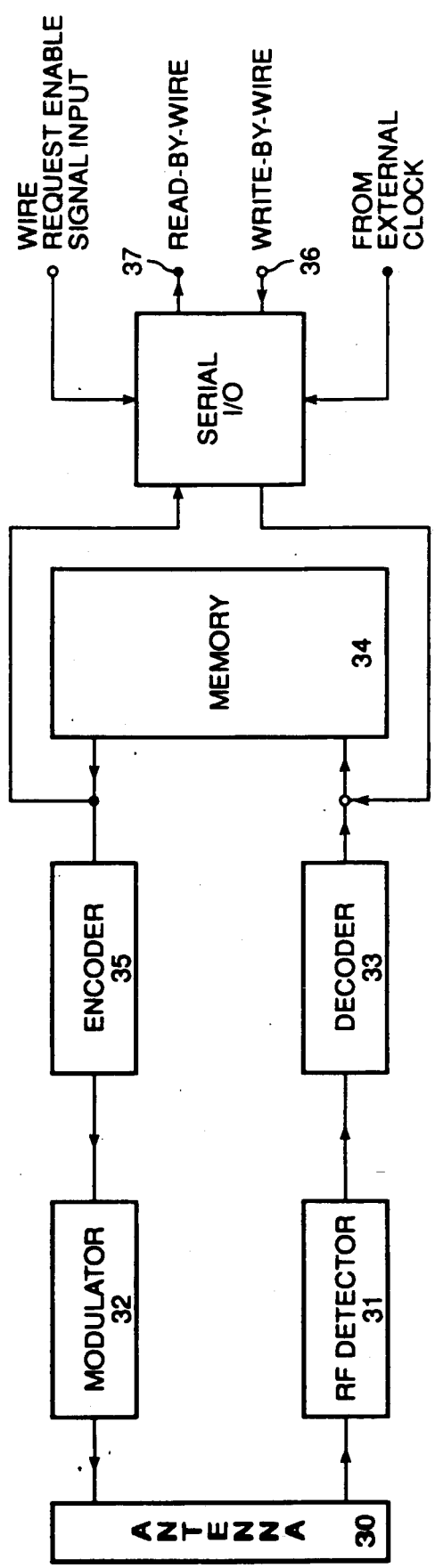
FIG. 3 is a block diagram, partially in schematic, of the circuitry of the READ/WRITE tag of the invention.

The circuitry of a preferred embodiment of the tag of this invention is shown in FIG. 3. The tag has an antenna 30, similar in type to that described in U.S. Pat. Nos. 4,782 345 and 4,816,839. Antenna 30 is connected as an input to an RF detector 31. When an interrogator desires to WRITE information into a tag, it sends an RF WRITE signal. The WRITE signal appears on antenna 30, passes through RF detector 31, and decoder 33 to message memory 34. A portion of RF detector 31 is always on, so it must be designed to use little power to conserve tag battery life. Decoder 33 separates the WRITE signal bit pattern into the four possible WRITE pulse codes shown in FIG. 2, a MODE signal, a binary ONE or a binary ZERO and a FRAME MARKER. If indicated by the proper sequence of signals, which will be explained later, the received data will be written into memory 34. This memory may be any non-volatile memory, such as EEPROM, EAROM or battery-backed RAM. If desired, the newly written data in memory 34 can be returned through encoder 35 and modulator 32 for backscatter modulation and verification by the interrogator.

When the tag backscatter-modulates the data in memory 34 for reception by an interrogator, the data from memory 34 is passed to encoder 35. Encoder 35 may be turned on, if desired, only in the presence of RF, to save battery power. This "read back message" from memory 34 is encoded by encoder 35 using the codes of this invention shown in FIG. 1. This encoded data is then passed to modulator 32. Modulator 32 modulates the backscatter, by changing the RF load on antenna 30, to send the encoded signals back from the tag to the interrogator. This backscatter modulation technique is described in more detail in U.S. Pat. No. 4,739,328.

Figure 4:
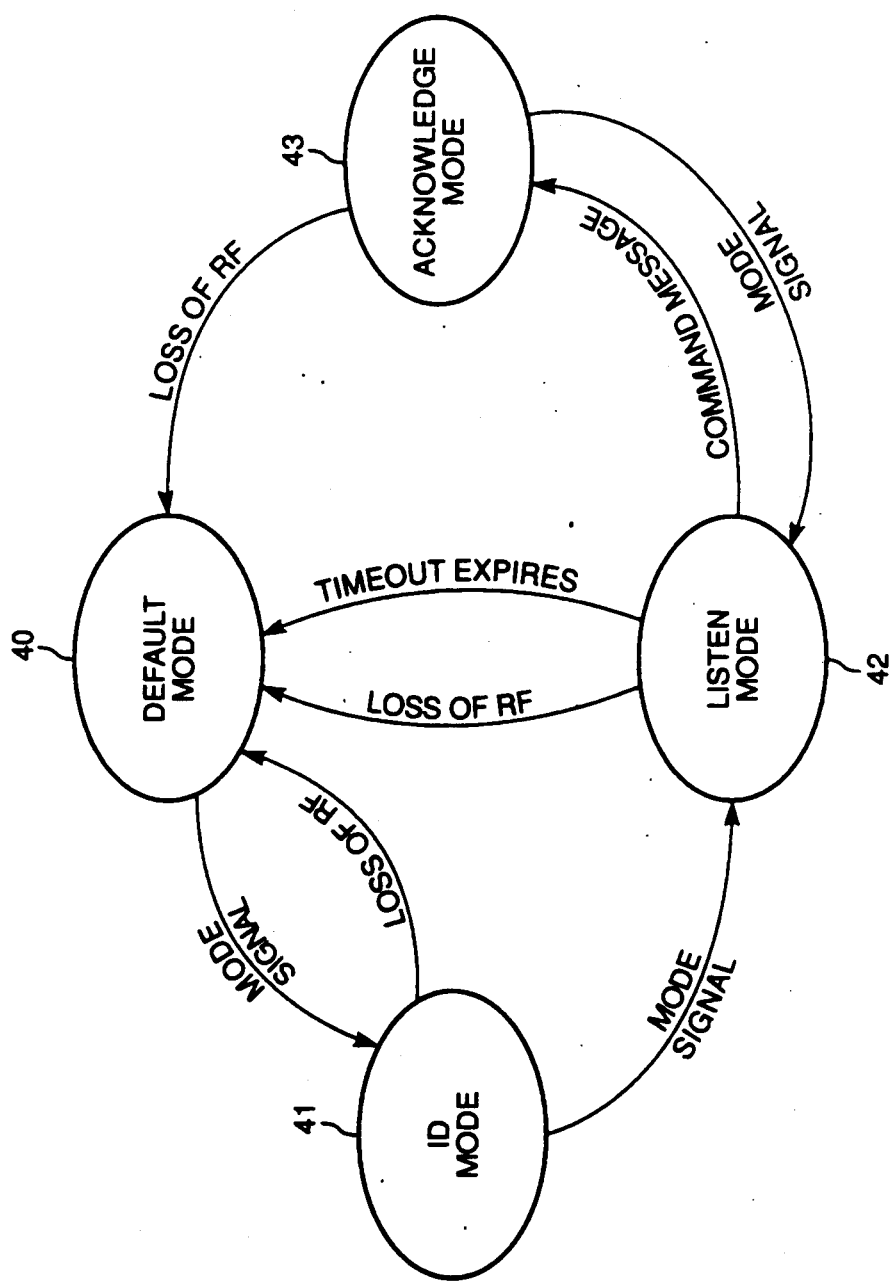
FIG. 4 is a state diagram of a tag of the invention.

The tag state diagram of FIG. 4 illustrates the signalling sequence used for reading information from the tag and writing information to the tag. When a tag is not in the RF range of the interrogator, it remains in the DEFAULT MODE 40. While in this MODE, the tag may be continually scrolling the data from its memory, so that it is always ready to backscatter-modulate any received RF signal. Alternatively, scrolling may be automatically initiated by the RF signal. As soon as a tag enters into an RF field of an interrogator, it may receive a MODE signal of the type shown in FIG. 2 from the interrogator. This MODE signal, as shown in FIG. 2D, has a frequency $f_2$ which, to avoid interference with READ signals, is less than or equal to one-half of the lowest READ pulse frequency $f_1$. This was discussed earlier. Upon recognizing the MODE signal while it is in DEFAULT MODE 40 shown in FIG. 4, the tag switches into the IDENTIFICATION MODE ("ID MODE") 41 in FIG. 4. In the ID MODE, the tag backscatter-modulates the received RF signal, after recognizing the MODE signal, with selected data contained in its memory. In one embodiment of the invention, frame #0 of the backscatter-modulated data has 5-bits for address data, 3-bits for any desired data which permanently resides in the tag other than the identification data, 64-bits for the tag identification, 47 additional bits for more user data, 4 checksum bits, leaving 5 extra bits in a reserved field. The tag continually scrolls through frame #0, sending the contained data back to the interrogator. While it is sending data in the ID MODE 41, if the tag receives a second MODE signal, it shifts to the "LISTEN MODE" 42 in FIG. 4. In the LISTEN MODE, the tag stops sending data and gets ready to receive data to be written into the tag by the interrogator. In the LISTEN MODE, there is no longer a possibility of interference between READ and WRITE pulses, since the backscatter-modulation in the tag is turned off.

While in the LISTEN MODE 42, if an interrogator desires to WRITE to the tag, the interrogator then sends a COMMAND message to the tag, as shown in FIG. 4. Upon completion of the message, the tag shifts into the "ACKNOWLEDGE MODE" 43 in FIG. 4. The COMMAND message consists of one or more frames of information contained in a sequence of ONES and ZEROS followed by a FRAME MARKER. A COMMAND message normally contains a COMMAND frame. COMMAND frames provide instructions to the tag, such as the desired locations in memory that transmitted data frames are to be stored. Such COMMAND frames may or may not be followed by actual data frames containing the data to be stored.

The interrogator may READ the acknowledgment frames from the tag in order to verify the previous COMMAND message sent. After a tag has received and compared the message, the interrogator may send an additional MODE signal, of the type shown in FIG. 2, which causes the tag to return to the LISTEN MODE 42. This MODE signal sets up the tag to receive additional commands to do various operations, including scrolling through selected contents of its memory, or receiving a WRITE COMMAND message from the interrogator. Such a COMMAND message will tell the tag where to store the next series of bits, called data frames, which it will receive. Other commands may be used to (1) unlock a fixed data field to allow data to be written into it; or (2) lock a variable data field so that no data may subsequently be written into it.

While the tag is in the ACKNOWLEDGE MODE 43, and the RF field stops for some reason so that the tag is no longer receiving a continuous RF signal from the interrogator, the tag automatically reverts to the DEFAULT MODE 40, as shown in FIG. 4. Accordingly, the arrow from ACKNOWLEDGE MODE 43 to DEFAULT MODE 40 shows "LOSS OF RF". The difference between the ACKNOWLEDGE and DEFAULT MODES is that in the latter, all message information may be scrolled, whereas, in the ACKNOWLEDGE MODE, just the recently received information is scrolled.

There are some situations where the tag is in the LISTEN MODE 42, shown in FIG. 4, and the tag is receiving an RF signal, but the signal contains no level transitions from ON to OFF, as shown in the WRITE codes in FIG. 2. The tag has a timer for detecting these level transitions, and when one does not occur for a predetermined period of time, the tag will detect the extended time between pulse edges, called a TIMEOUT, and automatically revert to the DEFAULT MODE 40, upon the expiration of the TIMEOUT, and recommence default scrolling. At this time, the tag may power down the decoder 33 and part of the RF detect 31 to conserve battery power. The tag also reverts from the LISTEN MODE 42 or from the ID MODE 41 to the DEFAULT MODE 40 upon the loss of RF, as shown in FIG. 4.

COMMAND messages are sent to the tag by the interrogator while the tag is in the LISTEN MODE 42. These frames set up the tag to do various operations, including scrolling through selected contents of its memory, or invalidating selected contents of its memory. Additionally, the LISTEN MODE 42 can be used for initially putting data into the tag using a hard-wired connection. This data is sent through WRITE-by-wire line 36 shown in FIG. 3. Sometimes it is desireable to change data in the tag on a semi-permanent basis prior to the time the tag is shipped. This data can be placed into the tag through this hardwired WRITE-by-wire connection while the tag is in the LISTEN MODE 42, and will remain in the tag until it is overwritten at a later time either by an interrogator using RF, or by a subsequent overwriting process through the hard-wired connection. The tag may also be READ by wire in the same manner, using READ-by-wire line 37 shown in FIG. 3.

Commands may be issued while in the LISTEN MODE 42 to change the data structure of the tag so that, when the tag returns to the DEFAULT MODE 40 while the tag is scrolling, the number of frames to be included in the scrolling can be changed, or a different set of frames may be selected. Furthermore, by changing one bit of the COMMAND code, certain variable RF frames within the tag may be rendered invalid so future interrogators will not accept the invalidated data. This procedure may be used, for example, to notify future interrogators that certain data in the tag is no longer valid. For example, if a tag attached to a railroad car has its contents modified, an interrogator can send a COMMAND code which invalidates the potentially inaccurate variable data in the tag.

The system of the invention preferably uses a single common RF carrier and RF signal polarization for both the READ and the WRITE signals.

As will be apparent to those skilled in the art, many modifications can be made to the preferred embodiment of the invention shown in FIGS. 1-4 and described above. Accordingly, the invention is only limited as set forth in the claims which follow.

We claim:

1. A system for reading data from and for writing data into a tag associated with an object which is moveable relative to an interrogator, comprising:

an interrogator means for sending a modulated RF signal to said tag, said signal including data intended to be received and stored by said tag;

at least one tag means which, upon receipt of a continuous RF signal, backscatter-modulates said RF signal and returns a backscatter-modulated signal to said interrogator, said backscatter-modulated signal being modulated with data relating to said remote object and being made up of signals of first and second frequencies $F_1$ and $2f_1$, respectively, where the second frequency $2f_1$ is twice the first frequency $f_1$, and where one of the two binary bits ONE and ZERO is represented by one-half period of a signal of said first frequency followed by one period of said second frequency, and the other of said two binary bits is represented by one period of a signal of said second frequency followed by one-half period of a signal of said first frequency;

said interrogator means (1) obtaining information from said tag means from said returned backscatter-modulated signal made up of the said signals of first and second frequencies and (2) transmitting data to said tag means, whereby data may be READ from, transmitted to and stored by said tag means very rapidly while said tag means or said interrogator means is moving.

2. The system for reading data from and for writing data into a tag of claim 1 further characterized by said backscatter-modulated signal always having a level transition from a high level to a low level or from a low level to a high level between periods of signals of frequency $f_1$ and $2f_1$.

3. The system for reading data from and for writing data into a tag of claim 1 further characterized by said backscatter-modulated signal designating binary ONES and binary ZEROS when said signals are received in their normal or inverted form by the interrogator.

4. The system for reading data from and for writing data into a tag of claim 3 further characterized by said backscatter-modulated signal having each portion thereof representing a single binary bit being inverted from the predecessor portion thereof signal representing the preceding binary bit, whereby the d.c. component of the signal representing a sequence of two binary bits is zero.

5. The system for reading data from and for writing data into a tag of claim 1 further characterized by said backscatter-modulated signal including a FRAME MARKER signal which contains five periods of signal frequency $2f_1$ followed by one-half period of frequency $f_1$.

6. The system for reading data from and for writing data into a tag of claim 5 further characterized by said FRAME MARKER signal being either the said five periods of signal frequency $2f_1$ followed by one half period of frequency $f_1$, for the inverted form of that signal.

7. The system for reading data from and for writing data into a tag of claim 5 further characterized by said FRAME MARKER being inverted relative to the binary bits preceding and following it.

8. The system for reading data from and for writing data into a tag of claim 5 further characterized by said FRAME MARKER, in conjunction with an odd number of binary bits preceding or following it, have a d.c. component equal to zero across the entire frame.

9. A tag adapted to be attached to a remote object, said tag containing data associated with said remote object and having at least a portion of its data contents variable by the receipt of a modulated RF signal from an interrogator which is moveable relative to said tag, comprising:
  a writable, non-volatile memory;
  a backscatter-modulating means which, upon receipt of a continuous RF signal, backscatter-modulates said RF signal and returns a backscatter-modulated signal to said interrogator, said backscatter-modulated returned signal being modulated with said data associated with said remote object, said backscatter-modulated signal being made up of signals of first and second frequencies $f_1$ and $2f_1$, respectively, where the second frequency $2f_1$ is twice the first frequency $f_1$, and where one of the two binary bits ONE and ZERO is represented by one-half period of a signal of said first frequency followed by one period of said second frequency, and the other of said two binary bits is represented by one period of a signal of said second frequency followed by one-half period of a signal of said first frequency.

10. The tag of claim 9 further characterized by said backscatter-modulated signal always having a level transition from a high level to a low level or from a low level to a high level between periods of frequency $f_1$ and $2f_1$.

11. The tag of claim 9 further characterized by said backscatter-modulated signal of designating binary ONES or binary ZEROS when said signals are received in their normal or inverted form by the interrogator.

12. The tag of claim 9 further characterized by said backscatter-modulated signal having each portion thereof representing a single binary bit being inverted from the predecessor portion thereof representing the preceding binary bit, whereby the d.c. component of the signal representing a sequence of two binary bits is zero.

13. The tag of claim 9 further characterized by said backscatter modulated signal including a FRAME MARKER signal which contains five periods of signal frequency $2f$ followed by a one-half period of frequency $f_1$.

14. The tag of claim 13 further characterized by said FRAME MARKER signal being either the said five periods of signal frequency $2f_1$ followed by a one-half period of frequency $f_1$, or the inverted form of that signal.

15. The tag of claim 13 further characterized by said FRAME MARKER being inverted relative to the binary bits preceding and following it.

16. The tag of claim 13 further characterized by said FRAME MARKER, in conjunction with an odd number of binary bits preceding or following it, having a d.c. component equal to zero across the entire frame.

17. A system for reading data from and for writing data into a tag associated with a remote object, said tag being moveable relative to the interrogator, comprising:
  an interrogator means for sending a modulated RF WRITE signal to said tag, said WRITE signal including data to be received and stored by said tag, said modulated RF WRITE signal having a first binary digit represented by a signal having a frequency $2f_2$ and the other binary digit represented by a signal having a frequency $4f_2$;
  at least one tag means which, upon receipt of a continuous RF signal, backscatter-modulates said continuous RF signal and returns a backscatter-modulated signal to said interrogator made up of two different frequencies, said backscatter-modulated signal being modulated with data relating to said remote object;
  said interrogator means (1) obtaining information from said tag means from said returned backscatter-modulated signal made up of the said signals of first and second frequencies and (2) transmitting data to said tag means, whereby data may be READ from, transmitted to and stored by said tag means very rapidly while said tag means or said interrogator means is moving.

18. The system for reading data from and for writing data into a tag of claim 17 further characterized by said WRITE signals representing each of the two binary bits being one period long.

19. The system for reading data from and for writing data into a tag of claim 18 further characterized by said period being one-half period of RF off followed by one-half period of RF on.

20. The system for reading data from and for writing data into a tag of claim 17 further characterized by said including a FRAME MARKER which contains one period of a signal of frequency $f_2$.

21. The system for reading data from and for writing data into a tag of claim 20 further characterized by said period being one-half period of RF off followed by one-half period of RF on.

22. The system for reading data from and for writing data into a tag of claim 17 further characterized by said RF WRITE signal including a MODE signal which contains four periods of a signal of frequency $f_2$.

23. The system for reading data from and for writing data into a tag of claim 22 further characterized by said four periods are four half-periods of RF off with four intervening half-periods of RF on.

24. The system for reading data from and for writing data into a tag of claim 17 further characterized by said backscatter-modulated signal being made up of signals of first and second frequencies $f_1$ and $2f_1$, respectively, where the second frequency $2f_1$ is twice the first frequency $f_1$, and where one of the two binary bits ONE and ZERO is represented by one-half period of a signal of said first frequency followed by one period of said second frequency, and the other of said two binary bits is represented by one period of a signal of said second frequency followed by one-half period of a signal of said first frequency.

25. The system for reading data from and for writing data into a tag of claim 24 further characterized by the frequency $f_2$ being less than or equal to one-half of the frequency $f_1$.

* * * * *